March 12, 1929.  A. W. LARIMORE  1,704,897
WINDSHIELD ATTACHMENT
Filed Nov. 4, 1927
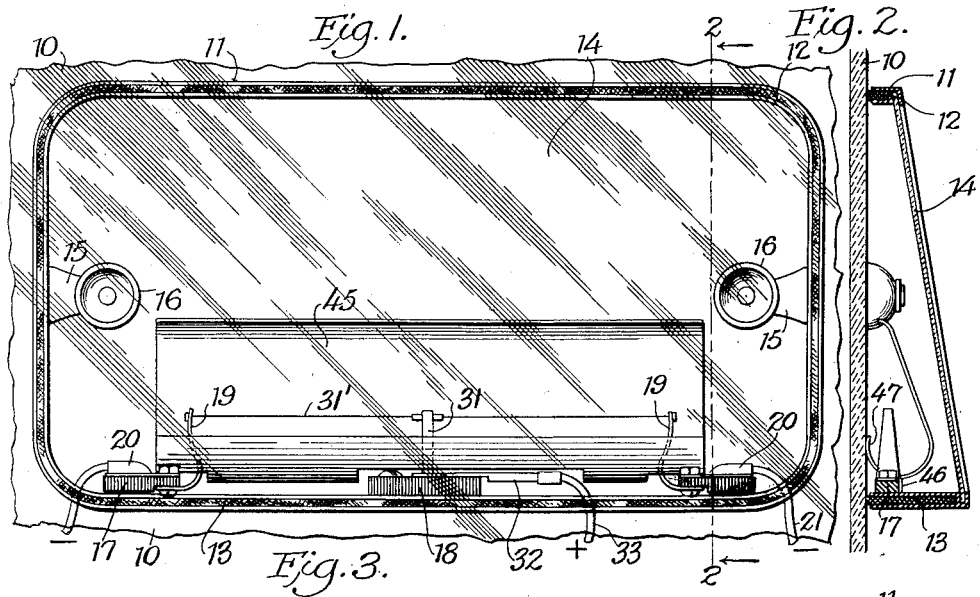
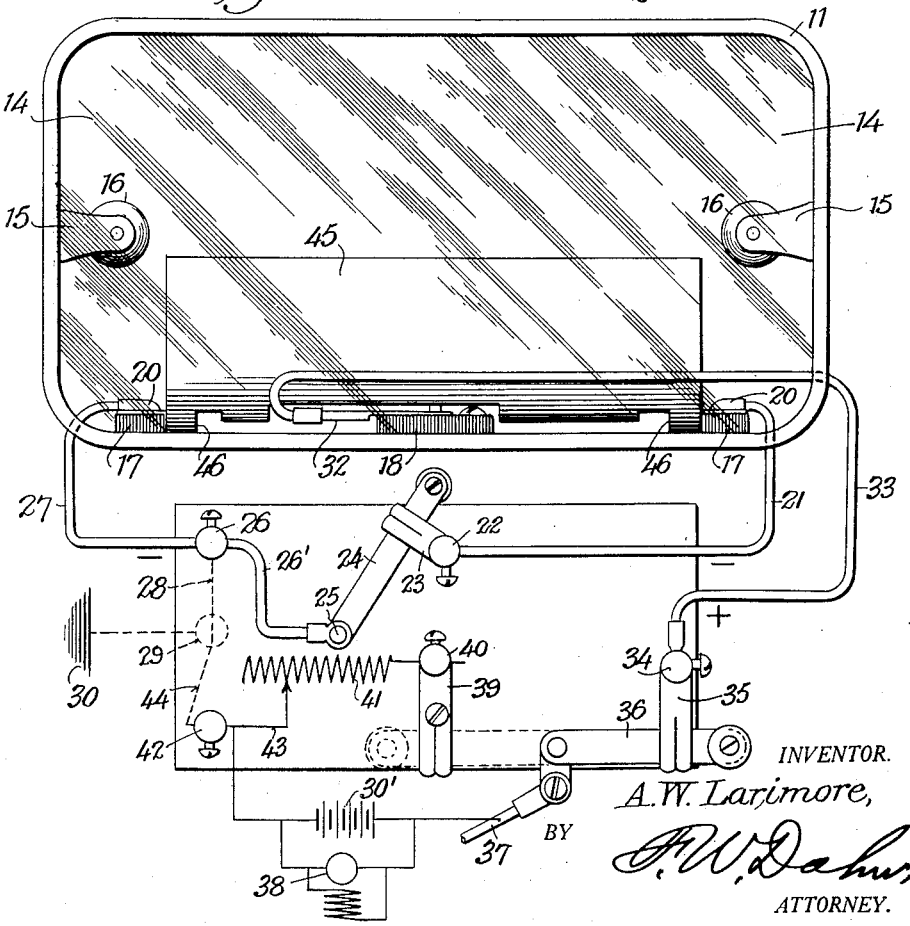
INVENTOR.
A. W. Larimore,
BY
F. W. Dahm,
ATTORNEY.

Patented Mar. 12, 1929.                                                                  1,704,897

UNITED STATES PATENT OFFICE.

ALBERT W. LARIMORE, OF COUNCIL BLUFFS, IOWA.

WINDSHIELD ATTACHMENT.

Application filed November 4, 1927. Serial No. 231,064.

My said invention relates to an automobile windshield attachment and it is an object thereof to provide a device of this character which shall apply heat to the windshield in a convenient and satisfactory manner to prevent sleet and snow from adhering to the windshield and to prevent the formation of ice thereon, the ice, sleet, etc., melting and running off like rain.

Another object of the invention is to provide a device of this character in which the heat applied to the windshield may be varied.

Another object of the invention is to provide an electrical heater with means whereby the surplus energy generated for the use of the heater can be disposed of in case the heater is not needed, without overcharging the battery.

Referring to the drawings, which are made a part of this application and in which similar reference characters indicate similar parts:

Fig. 1, is an elevation of my device in working position as seen from the outside of the car, looking in through the windshield, Fig. 2, a section on line 2—2 of Fig. 1, and Fig. 3, an elevation of my device as seen in looking out through the windshield, the electrical connections being also shown in this figure.

In the drawings, reference character 10 indicates a fragment of the windshield to which my device is or may be attached. The device in general comprises a frame consisting of an outer frame member 11 of suitably formed sheet metal, an inner frame member 12 secured to member 11 by screws and a strip of felt or rubber 13 interposed between the frame members 11 and 12, this strip having its edge adjacent the windshield exposed so that it may be pressed firmly against the glass of the windshield and thus provide a packing to retain the heat within the frame. An insert 14 preferably of transparent material such as celluloid, mica or glass is held between the frame members 11 and 12 as clearly shown in Fig. 2. Brackets 15 of thin steel spring material at the sides of the frame support suction cups 16 by means of which the entire device may be held in place on the windshield in a manner well understood by those skilled in the art, or other suitable means may be used.

Blocks 17 and 18 of insulating material are supported on the inner frame member in any suitable manner as by means of screws. The blocks 17 have attached thereto spring binding posts 19 and these binding posts may be secured to the respective blocks, as shown in Fig. 1, by screws which also serve to hold connectors 20 in position, the screws also providing electrical connections between said posts and said connectors. A conductor 21 leads from a connector 20 to a binding post 22 carrying a stationary switch member 23 arranged to coact with a switch member 24 pivoted at 25 and connected to a binding post 26 by a conductor 26'. Another conductor 27 leads from the other connector 20 to the binding post 26, from which still another conductor 28 leads to a post 29 connected to a ground 30 on the frame of the machine and so to the negative pole of the battery 30' as usual. The positive pole of the battery is connected to a binding post 31 at the middle of the heating element 31' supported by spring posts 19, 19 by a train comprising a connector 32, a conductor 33, a binding post 34, a stationary switch member 35, a pivoted switch member 36, and a conductor 37. A generator 38 is connected to the battery 30' in any conventional or desirable manner.

The switch member 36 may be moved to the dotted line position to engage a stationary switch member 39 on a post 40. A resistance coil 41 connected to post 40 is adjustably connected to a post 42 by a connector 43 and the post 42 is connected to post 29 by a conductor 44.

Between the windshield and the heating element I have arranged a polished reflector 45 preferably of copper, to throw the heat against the windshield. Either the reflector or the insert 14 may be omitted without seriously affecting the efficiency of the device, though I prefer to use both. As here shown the reflector has ears 46 secured to the blocks 17 at the rear side thereof, i. e., the side nearest the driver, in any suitable manner. The lower part of the reflector is shown as cut away to accommodate block 18 and the part between the blocks is bent upwardly toward the windshield as shown at 47 in Fig. 2.

The heating element is made of the regular heating element round wire, and is 11" long for a 6 volt battery. This will draw from 5 to 7 amperes when turned on full force. On the account of extra amperage being used when the heater is in operation, the generator of the car will have to be set so as to generate the extra amount so that the battery will not be discharged below normal.

By arranging the heater as shown, so that either half can be heated independently of the other, (the elements being in effect in parallel) the resistance is reduced and the element will throw off more heat than if the opposite ends of the wire 31' were connected respectively to the positive and negative sides of the battery. For this purpose the switch member 24 may be closed to cause the current to pass from post 31 to both posts 19, 19, etc., or if the switch is opened one half the heater will be cut out, and only one half of the heater will be used, this being another reason for connecting the feed wire 33 to the middle of the heating element.

When the heater is cut off, the switch lever 36 is thrown to the left hand binding post, and the extra current which is now not being used, but is being generated, will pass through resistance coil 41 to the grounded binding post. This resistance is variable, so that with the indicator set at different points on the coil, or a suitable dial, will regulate the amount of current flowing through the resistance.

The switch board is necessarily a part of the unit, but is used as a battery equalizer when the frame is detached from the windshield glass. By the use of this equalizer it is unnecessary to retard the generator when the heater is not being used. This prevents having to burn the lights to use up the extra amount of electricity, which would overcharge the battery if it was not used in some manner. The equalizer can be attached to a car without the heating element, to regulate the charging of the battery on long drives where the lights are not used enough to keep the charge down to normal.

It will be obvious to those skilled in the art that various modifications may be made in my device without departing from the spirit of the invention and therefore I do not limit myself to what is shown in the drawings and described in the specification but only as indicated in the appended claims.

Having thus fully described my said invention what I claim as new and desire to secure by Letters Patent is:

1. In a heating attachment for windshields, a frame substantially rectangular in form and provided with a felt strip for engagement with the windshield and vacuum cups for attachment thereto, said frame having on its back side a cover of transparent material, electric heating elements mounted on the lower side of said frame and insulated therefrom, and a reflector shield carried by the lower side of the frame and located between the heating elements and the cover whereby the heat will be directed against the windshield.

2. A heating attachment for windshields, comprising a frame having a transparent back cover, and two heating elements carried by the lower side of said frame, a shield for directing the heat towards the windshield, and means for connecting one or both of the heating elements to a source of energy.

3. A heating attachment for windshields, comprising two substantially rectangular flanged frames, a strip of felt for engagement with the windshield clamped between the frames, a transparent cover clamped between the flanges, and two electric heating elements carried by the lower side of the frames and insulated therefrom.

4. A heating attachment for windshields, comprising an elongated electrical heating element, a reflector at the side of the heating element remote from the windshield said reflector extending below and above said heating element, means including a suction cup at each end of the reflector for securely fastening the attachment to a windshield, and means for connecting the heating element to a source of electricity.

In testimony whereof I affix my signature.

ALBERT W. LARIMORE.